US009009817B1

(12) United States Patent
Wieland

(10) Patent No.: US 9,009,817 B1
(45) Date of Patent: Apr. 14, 2015

(54) VIRTUAL SMART CARD TO PERFORM SECURITY-CRITICAL OPERATIONS

(71) Applicant: Open Invention Network LLC, Durham, NC (US)

(72) Inventor: Martin Wieland, Munich (DE)

(73) Assignee: Open Invention Network, LLC, Durham, NC (US)

( * ) Notice: Subject to any disclaimer, the term of this patent is extended or adjusted under 35 U.S.C. 154(b) by 94 days.

(21) Appl. No.: 13/796,834

(22) Filed: Mar. 12, 2013

(51) Int. Cl.
H04L 9/32 (2006.01)
G06F 21/34 (2013.01)
G06F 21/32 (2013.01)

(52) U.S. Cl.
CPC ............. G06F 21/34 (2013.01); G06F 21/32 (2013.01)

(58) Field of Classification Search
None
See application file for complete search history.

(56) References Cited

U.S. PATENT DOCUMENTS

| | | | |
|---|---|---|---|
| 3,678,250 | A | 7/1972 | Dethloff et al. |
| 4,092,524 | A | 5/1978 | Moreno |
| 4,211,919 | A | 7/1980 | Ugon |
| 5,590,199 | A | 12/1996 | Krajewski, Jr. et al. |
| 5,742,756 | A | 4/1998 | Dillaway et al. |
| 5,811,771 | A | 9/1998 | Dethloff |
| 5,941,947 | A | 8/1999 | Brown et al. |
| 6,941,285 | B2 * | 9/2005 | Sarcanin .................. 705/67 |
| 7,080,039 | B1 | 7/2006 | Marsh |
| 7,085,931 | B1 | 8/2006 | Smith et al. |
| 7,444,522 | B1 | 10/2008 | Chang et al. |
| 7,490,151 | B2 | 2/2009 | Munger et al. |
| 8,719,575 | B2 * | 5/2014 | Attia et al. .................. 713/175 |
| 2008/0046984 | A1 * | 2/2008 | Bohmer et al. ................ 726/5 |
| 2008/0288404 | A1 * | 11/2008 | Pirzadeh et al. ............... 705/44 |
| 2009/0080645 | A1 * | 3/2009 | Furukawa ..................... 380/28 |
| 2009/0132813 | A1 * | 5/2009 | Schibuk ...................... 713/158 |
| 2009/0300747 | A1 | 12/2009 | Ahn |
| 2010/0299198 | A1 * | 11/2010 | Catania et al. ............ 705/14.38 |
| 2011/0179284 | A1 * | 7/2011 | Suzuki et al. ................ 713/186 |

(Continued)

FOREIGN PATENT DOCUMENTS

| | | |
|---|---|---|
| DE | 1945777 | 7/1970 |
| EP | 1455503 | 8/1999 |
| EP | 0936530 | 9/2004 |

OTHER PUBLICATIONS

"Cloud Computing", Nov. 15, 2010, Wikipedia, (http://en.wikipedia.org/wiki/Cloud_computing).

(Continued)

Primary Examiner — Christopher Revak
(74) Attorney, Agent, or Firm — Haynes and Boone, LLP

(57) ABSTRACT

A portable data or information carrier in the form of a smart card with partially or fully virtualized components. To maximize the confidentiality of information stored in the carrier, and more specifically to limit the amount of information available to a potential defrauder, electronic components such as circuits, I/O, cryptographic, memory and dummy objects are built, modified or influenced on demand from physical characteristics of an eligible person or device. Digitized unique biometric or hardware identifiers are read upon startup and runtime of the device and, in case of an eligible person or device, subsequently supply all values necessary for determination of the characteristics of the user specific virtual smart cards objects, their placement and connections. By multi-factor authentication, the end-user or device will retain sole control of its keys and use them for authentication, signature or encryption purposes as if he had a physical smart card in his hand.

20 Claims, 6 Drawing Sheets

(56) References Cited

U.S. PATENT DOCUMENTS

2011/0266350 A1* 11/2011 Chapman ............... 235/488
2013/0060686 A1* 3/2013 Mersky ................. 705/41

OTHER PUBLICATIONS

"Smart Card", Nov. 13, 2010, Wikipedia, (http://en.wikipedia.org/wiki/Smart_card).
"Virtual Machine", Nov. 13, 2010, Wikipedia, (http://en.wikipedia.org/wiki/Virtual_machine).
Jerry Archer, et al., "Top Threads to Cloud Computing v1.0", Mar. 2010, Cloud Security Alliance.
Frank Morgner, et al., "Virtual Smart Card", Apr. 11, 2012, (http://vsmartcard.sourceforge.net/virtualsmartcard/README.html).
Dmitry Basko, "Development of PC/SC compatible driver for Windows", 2003, (http://www.bds.dogma.net/pc_sc.htm).
Mendel Rosenblum, "The Reincarnation of Virtual Machines", Jun. 2004, Stanford University.
Kurt Claeys, "The need for worldwide scalability of applications influences solution architectures in Azure hosted applications", Apr. 2009.
"VeriSign Certification Practice Statement", Feb. 1, 2009, Verisign Inc.
Carl Ellison, et al., "Ten Risks of PKI", Nov. 1999, Computer Security Journal, vol. XVI, No. 1, 2000.
Gerhard De Koning Gans, et al., "A Practical Attack on the Mifare Classic", Feb. 2008.
Karsten Nohl, et al., "Mifare—Little Security, Despite Obscurity", Jul. 31, 2008, USENIX Security Symposium.
Karsten Nohl, "Cryptanalysis of Crypto-1" Mar. 2008.

* cited by examiner

VIRTUAL SMART CARD TO PERFORM SECURITY-CRITICAL OPERATIONS

TECHNICAL FIELD OF THE INVENTION

This invention relates to transmission of data between electronic devices, and more particularly to providing secure authentication, encryption and decryption of data.

BACKGROUND OF THE INVENTION

Transactions carried out across unprotected networks such as the Internet enable increased service availability and higher convenience at all levels. The Internet has been utilized for a significant amount of commercial and personal communication in nearly all regions of the world. Governments across the world are aiming to provide Internet-enabled services to their citizens. In order for the Internet to be used to conduct sensitive operations, each party involved in a transaction or communication has to be capable of confirming their identity in a trusted way. Data protection is also important to ensure secure and trustworthy transactions.

It is challenging to implement efficient solutions which address the above-noted security requirements and those currently being utilized raise ongoing concerns. As a result, the reputation of transactions over unprotected networks continues to suffer as the systems widely deployed today remain vulnerable to increasingly sophisticated attacks.

Traditional techniques used to secure Internet-based infrastructures often utilize a public key infrastructure (PKI) scheme. In operation, a user disposes of a unique public key pair certified by a trusted body, such as the certification authority, which delivers a digital certificate. While one of the two keys is made publicly available, the second one must be kept secret from everybody else as it will enable its respective owner to prove their identity and use it for authentication and/or signature purposes. FIG. 2 illustrates an overview of such keys, certificates and certificate authorities, which may be used in such a PKI scheme. FIG. 2 illustrates the use of such keys, certificates and certificate authorities for signing, encrypting and decrypting communications.

In a secure deployment, there will be clients, services and certificate authorities. Each of these entities is associated with public and private keys and certificates. Each party has a private key and a corresponding public key. A message encrypted using a public key can only be decrypted and read using the corresponding private key. This allows the client to send a message that only the server can read. A message signed with a private key can be checked using the corresponding public key. If the message has been changed after signing, then the check will fail. This procedure allows the server to confirm that the message was really sent by the client.

As illustrated in FIG. 2, there are three public-private key-pairs, one for each party. The client 220 uses a copy 215 of the server's public key 206 to encrypt 214 the request, and its own private key 219 to sign 218 the request. The server 208 uses a copy 209 of the client's public key 221 to check 212 the signature, and its own private key 210 to decrypt 211 the signature. Such a procedure provides a secure data transaction, provided that both parties can obtain the required public keys. Although it does not matter if a third party obtains access to the public keys, it does matter that the third party has the correct public keys. If an attacker gives the server their public key, pretending to be the client, then the server will accept messages sent by the attacker. Likewise, if the client wants to send a message to a server, but uses the attacker's public key instead of the server's public key, then the client will send messages that the attacker can read. To prevent unauthorized access, the public keys are paired with a certificate providing the identity of the owner of the private key.

The server and client public key and certificate bundles 221 and 206 are signed 203 and 204 by a certificate authority's 200 private key 201 to confirm that the details are correct. The effect of this procedure is that each party only needs to obtain the certification authority's public key 202 by some trusted mechanism, and can use that to verify any other keys. FIG. 2 illustrates the example of only one certification authority (CA). In more complicated situations, the client and server might have their certificates signed by different CAs. In that case, each must trust the CA that signed the other party's certificate. Also, FIG. 2 only illustrates the request message. The response would be signed and encrypted by the service and checked and decrypted by the client in a similar manner.

Even with correctly signed client's and server's public key and certificate bundles, one skilled in such a communication system would quickly discover that absolute privacy of each party's private key is fundamental to public key infrastructure. If an attacker gets a hold of any of the private keys it's quite simple to then assume that party's role. If, for example, the private key of a party is stored on a common storage device of the party an attacker can obtain access, then the private key may be accessed by simply mirroring the storage device.

Taking into account that today's commonly used multi-purpose electronic devices, such as personal computers (PCs) or mobile devices, are not considered secure enough to hold such keys, most institutions with stringent security levels choose to store the private keys on external chips embedded on pocket-sized cards with integrated circuits. For example, smart cards, chip cards or integrated circuit cards may be used to store private keys. There are two broad categories of smart cards. Memory cards only contain non-volatile memory storage components and occasionally dedicated security logic. Microprocessor cards additionally contain volatile memory and microprocessor components. Memory cards provide storage capabilities and an input/output interface. Cryptographic microprocessor cards allow for the supported cryptographic algorithms to be performed on the hardware itself.

The tamper resistance of known smart card architectures is based on a high level of miniaturization which makes physical disassembly difficult. Also, sophisticated software architectures, such as a proprietary operating system may offer additional security. Although some of these techniques already provide a high level of security they also have common disadvantages caused by their design. Memory and processor cards simply relocate the storage of the sensible private key from one seemingly secure physical device to another. As the secure device is small and portable the responsibility for securing the private key is simply shifted along to the customer. The high level of miniaturization requires prefabrication of large numbers of anonymous cards, which requires unique characteristics of the final customer, such as a fingerprint. Those unique characteristics may be stored in the card memory but cannot be part of the card's electrical circuits as this would lead to large costs and time for production.

Solutions which are based on smart cards still seem practical from a security point of view, however, there are additional disadvantages which prevent large scale deployment. The external medium which carries the chip containing the private key may be lost or stolen. As the secret memory of the smart card then can be attacked for an unlimited time period with an ordinary stock-commercial card reader in combination with free available libraries, it is possible to crack the private key, clone and manipulate the card.

Built-in smart card readers are not a de facto standard on PCs and laptops. There is no widespread communication standard on the market that can enable computers and chip cards to interact together in a seamless manner. Therefore, to make use of the chip card, the end user has to acquire a smart card, a smart card reader and install the reader on the computer. This is both time consuming and expensive. The convenience and portability offered by the Internet are considerably reduced. When the end user has to carry small pieces of hardware to retain control over the computer, the advantages of to such a system are questionable when compared to less secure legacy systems.

Although virtualization of physical smart card components, smart card specific operating systems, communication, encryption and decryption are disclosed in detail all known techniques do not address the problem on how to successfully relocate components of a real smart card to a virtual environment without loosing any of the advantages of a physically present external device.

SUMMARY OF THE INVENTION

Example embodiments of the present invention include identifiers that may be used to create a virtual wire which points to the base address of a virtual smart card object and subsequently supplies all values necessary for determination of the placement of further user-specific virtual smart card objects and their connections. Without correct keys or with partially incorrect keys, the virtual address lines that lead to components of the virtual card are disconnected or point to incorrect dummy objects. By utilizing a multi-factor authentication, the end-user or device will retain sole control of its keys and use them for authentication, signature or encryption purposes just as if the user had a physical smart card in his or her hand.

In one example, in a real customer case scenario, if an e-Banking user desires to sign orders online, the first step would be for him to apply for a smart card by providing his credentials including unique biometric identifiers and his identity at the local registration authority, which could be the local branch of a participating bank. Based on the customer's credentials, a fully or partially virtualized smart card is generated with objects that can be found by parts of the authorized person's unique identifiers. Correct values of an initial input key stream point to the user's specific smart card components and enable access to the appropriate input/output (I/O), storage, crypto-components and secret portion(s) of the card's memory. A public key pair and a certificate are then generated on a central server kept in a highly secure environment. Once this initialization process is completed, the customer is able to log on to his e-Banking-enabled website and request an order. Knowing that he is a user of a virtualized smart card, the e-Banking application will send a transaction signature request to the customer's smart card which requires access to the customer's private key. By directly interacting with his smart card, the user is prompted for his unique identifiers. The smart card processes the identifiers presented, builds virtual circuits and components and finally opens up access to the card's secret memory zone. A remote signature server retrieves the user's key from the secret zone, signs the transaction data and sends back the signed response.

The above-noted scenario provides that even with a copy of the customer's smart card in hand, a potential defrauder cannot attack the secret memory to analyze and obtain the private key as the smart card's components including it's secret memory are neither existing nor connected with each other. Under no circumstance has the user's sensitive data been exposed to a vulnerable environment. In this example, the core security attributes of the transaction like access to the secure memory area, storage of private keys, comparison of private and public keys are solely managed inside of the encapsulated virtual environment. As a result, the application provider can focus on other activities. The only consideration for the application provider is to enable his applications and make them ready for virtualized smart cards. The user has no restrictions on his workstation. In case he's using a fully virtualized smart card he only has to use a standard computer with one or more peripheral devices that allow reading of unique identifiers when requested by the smart card.

As a result of implementing such a security measure, a customer is free to perform secure e-Banking operations from almost anywhere. The solution is easier to maintain in the long term. Revocation and renewal processes can simply be managed on a central server. As described above, the virtual smart card is derived from the PKI-based smart card design, however, it is created without the added costs, complexity and vulnerability associated with the deployment of physical cards, card readers and large-scale PKI systems. Compliance to existing directives for secure signature creation devices is achievable through the use of virtualized smart cards as it is possible to prove that keys are exclusively controlled by the end-user, through the smart card itself.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and computer storage medium, as represented in the attached figures, is not intended to limit the scope of the invention as claimed, but is merely representative of selected embodiments of the invention. The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
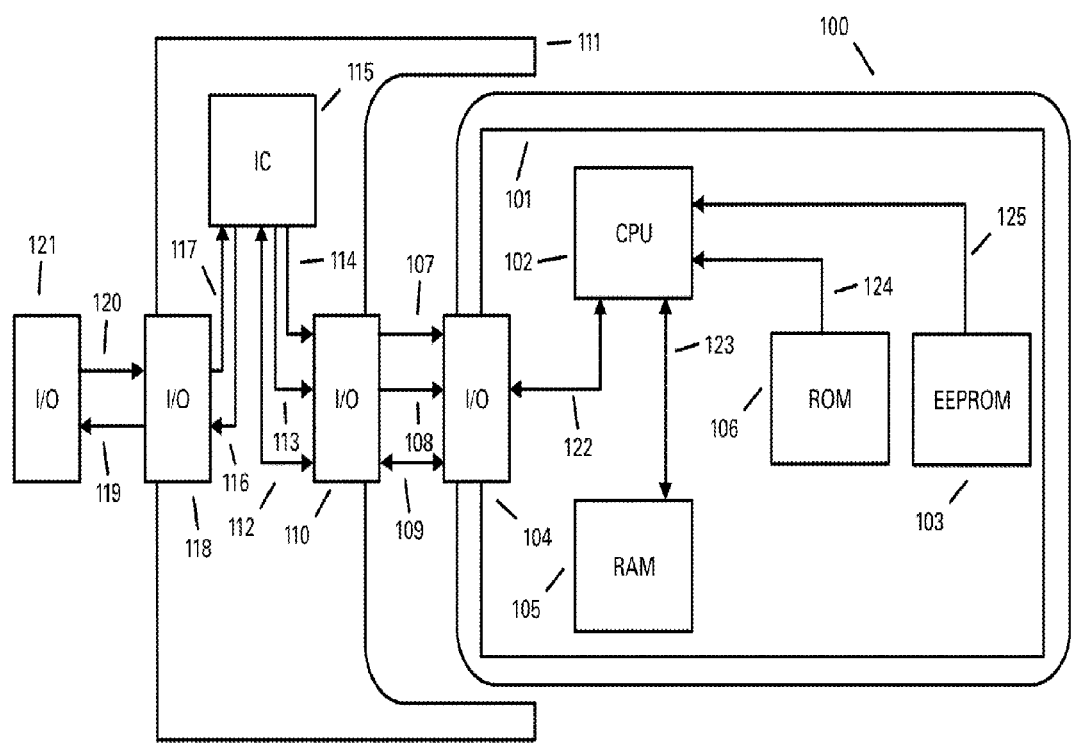
FIG. 1 illustrates a schematic diagram of a conventional smart card and reader system, according to example embodiments of the present invention.
Figure 2:
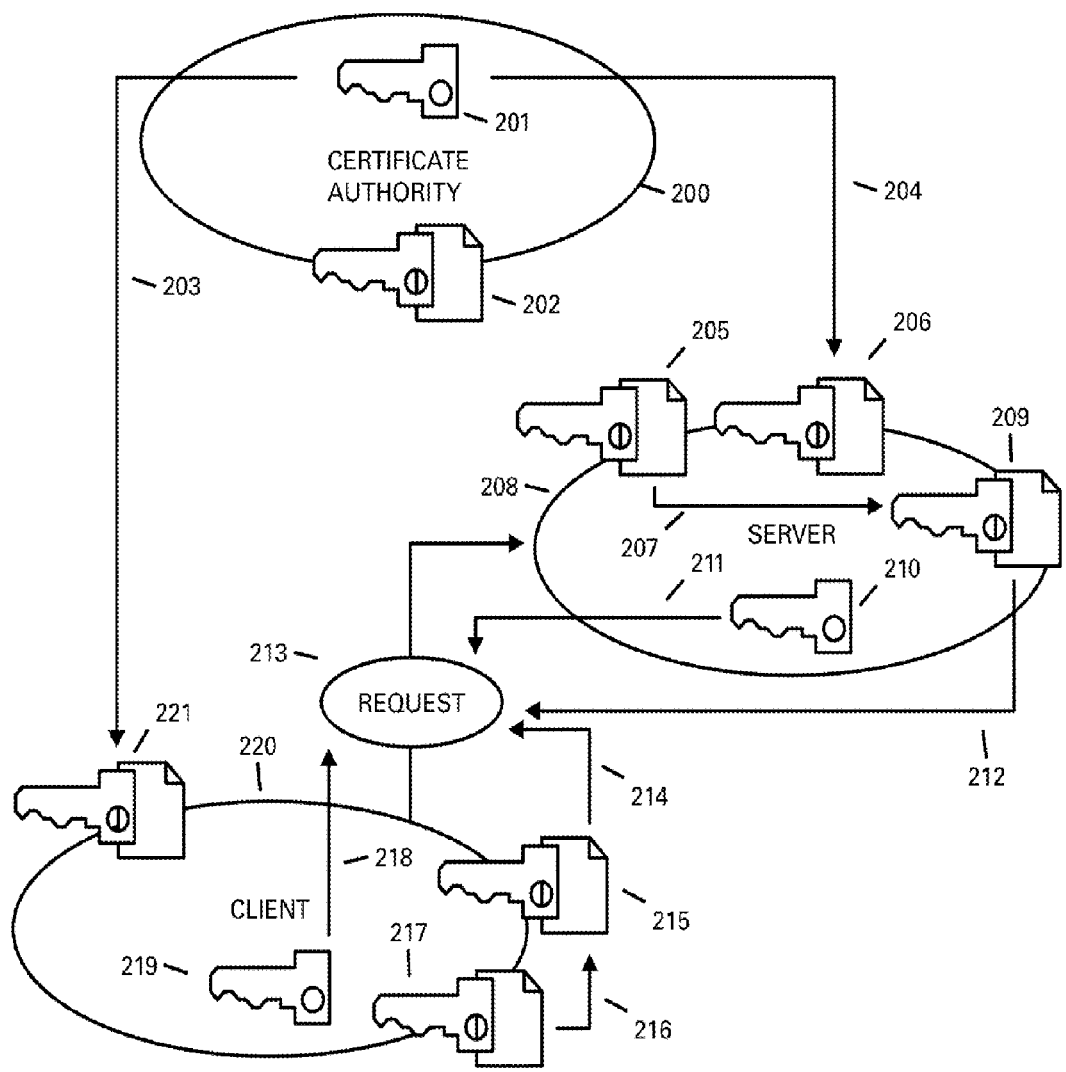
FIG. 2 is a block diagram showing an overview of keys, certificates and certificate authorities as used in a PKI scheme.

FIG. 1 illustrates an example schematic diagram of a conventional smart card and reader system, according to example embodiments of the present invention. Referring to FIG. 1, the card and reader system includes a peripheral I/O interface 118 that enables communication between the reader 111 and the I/O interface 121 of a host, such as a computer, a point of sale terminal, a mobile telephone or an automated teller machine. The interface may be built up by various standards such as a RS-232 serial port, USB port, PCMCIA slot, floppy disk slot, parallel port, infrared IRDA port or keyboard interface. The interface may include at least one line for transmission 119 and one line for reception 120 of data from and to the host. Data received 117 from the host is provided to an integrated circuit (IC) 115, which also handles transmission 116 of data designated for the host. The IC uses one single (I/O) line 112 for transmission and reception 109 of data to and from the smart card's 100 I/O interface 104.

Handling of data transfer in both directions by one line requires a clock signal (CLK) 108 which is generated and sent 113 by the IC. The CLK 108 allows derivation of data communication timing. Additionally, the IC provides a reset signal 114 (RST) which allows to reset 107 the card's communication. The transmission lines between reader 111 and smart card 100 may be built in wired or wireless form depending on the type of smart card, either a contact card as defined by ISO 7816, which requires a locally available card reader or a contact less card which uses radio frequencies for communication. Although FIG. 1 illustrates a smart card with an integrated circuit 101 including volatile memory 105 that is connected 123 to a microprocessor 102, ROM 106 and EEPROM 103, the smart card design may be applicable to all kinds of smart cards such as magnetic strip cards that have a strip of magnetic tape material attached to its surface, memory cards that only contain non-volatile memory storage components and dedicated security logic components.

Figure 3:
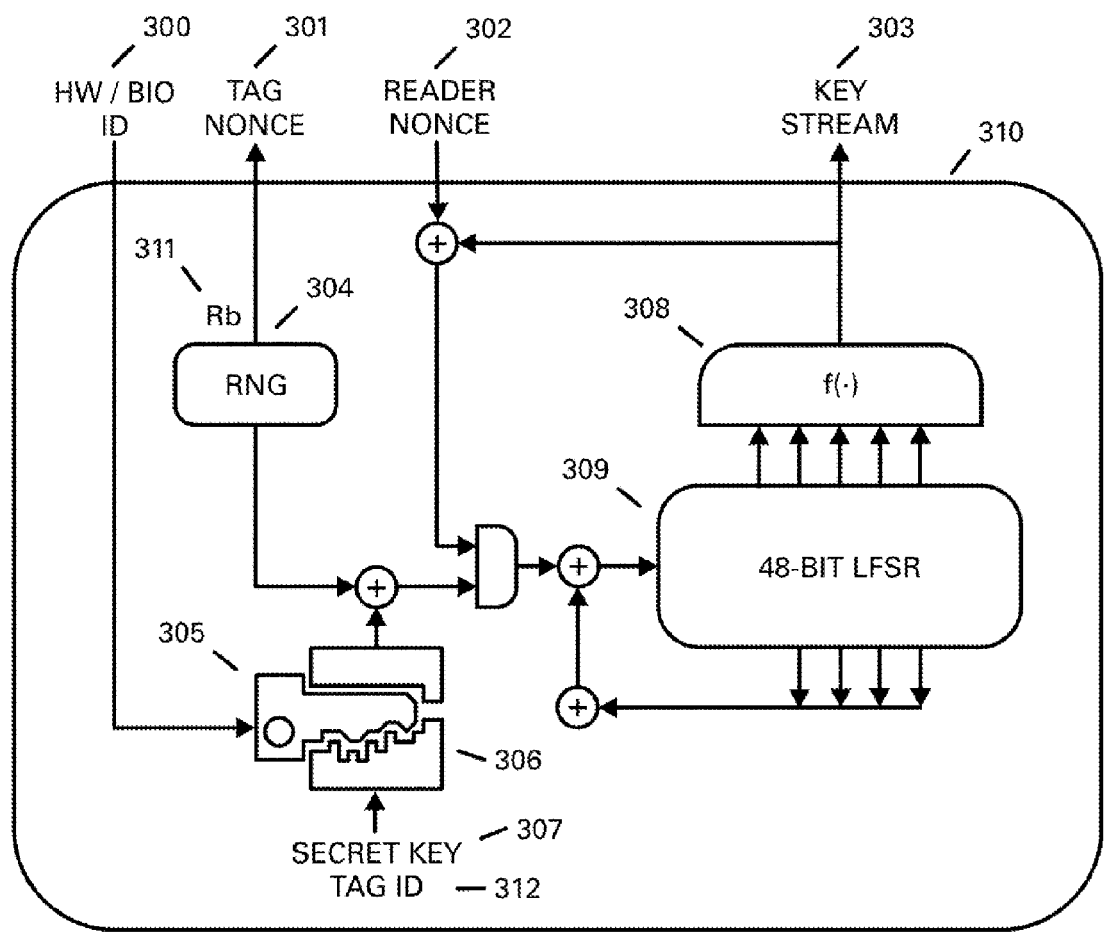
FIG. 3 is a block diagram that shows a possible implementation of a lock and a biometric or machine ID key into the cryptographic architecture of a MIFARE memory smart card equipped with dedicated security logic components.

Examples of security logic components according to example embodiments may include a linear feedback shift register LSFR 309 and a random number generator RNG 304, as illustrated in FIG. 3, or multi-component cards such as vault cards, fingerprint cards, one time password display cards and bio-assaying-fluidics sensor cards. Some of these multi-components cards already have the ability to utilize unique biometric IDs of the user (i.e., fingerprints) to grant or decline access to the card's secret memory zone.

In FIG. 3, a block diagram is illustrated that includes an example implementation of a lock and biometric and/or machine ID key implemented as part of the cryptographic architecture of a memory smart card equipped with dedicated security logic components, according to example embodiments. For protection of the secret key 307, the card's 310 cipher may include a linear feedback shift register (LFSR) 309, a filter function f(.) 308 and a random number generator (RNG) 304. During initialization, the secret 48-bit key 307 is loaded into the shift register 309 and the string (Tag ID 312 xor Rb 311) is shifted into the state where ID is the identifier of the tag, and Rb is a random number selected by the tag. The random number Rb is sent 301 to the reader as a first challenge in a card challenge 301. Reader response 302 protocol may be used to prove knowledge of the secret key 307.

An additional example of a unique hardware or biological ID 300, which initially is transmitted from the reader and acts as a key 305 for a lock 306, protects the secret key and the tag ID. In this example, the card and the reader are still physical devices with hardwired circuits, which, when in the hands of a potential defrauder, allow independent attacks for an unmeasured period of time by known challenge and response analysis methods. As long as there is a visible, identifiable component of a static object, such as a lock combined with enough time to analyze the lock successful, attacks will remain possible. As disclosed by the German scientists Karsten Nohl and Hendryk Plotz at the CCC Congress in 2007 for the MIFARE Smart Card, the possibility to communicate with the cryptographic components of the card enabled them to find out the cards structural weaknesses and circumvent the encryption. However, as Nohl and Plotz tried to reconstruct the cards circuits from photos of the chip, they found out that the highly miniaturized chip has several thousand gates built of around 70 types of gates. As more than 90% of them are dummy components they focused on "Strings of flip-flops (registers)", "XOR gates" and "units around edges that are sparsely connected to the rest of the chip". The result of the experiment was that physical reproduction of a single MIFARE smart card chip is a "very error-prone" and tedious process. Even if detection and selection of the responsible components gates could be automated, the result of the process would just be applicable for a single type of card. A specific type of smart card with specific circuits for every customer would drastically increase the security of smart cards. The effect of astronomic costs for every single card can be omitted by usage of virtual electronic components which are built, modified or influenced on demand according to unique IDs of the entitled user or device.

Figure 4:
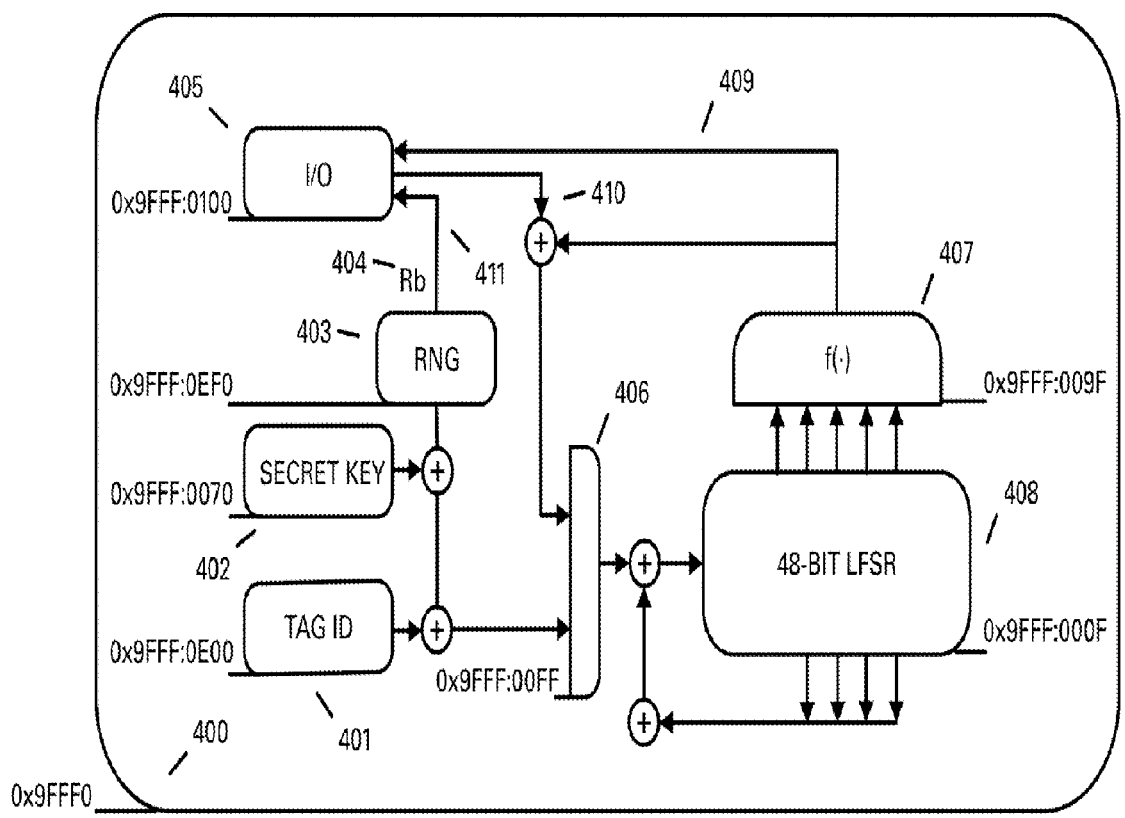
FIG. 4 is a block diagram showing a functional virtual smart card with correct base address, object offsets and connections built up by read unique identifiers in accordance with the present invention.

FIG. 4 illustrates an example embodiment of an already created fully virtualized smart card. The entire smart card object 400 has a base address of "0x9FFF0", all objects for communication (I/O 405), storage (Memory for the Secret Key 402, Memory for the Tag Id 401), selection (Gate 406), wiring (Wires 409 410) and cryptography (Filter Function 407, Random Number Generator 403 and Linear Feedback Shift Register 407) reside at specific offsets from the base address. With correct offset values the virtual wires (pointers) between the objects point to the correct location. A non-initialized but already personalized smart card could have large numbers of addressable gates, crypto, storage and other components that are dummy components with incorrect content, invalid pointers and memory offsets.

Creation of the card can be initialized by reception of a unique ID (e.g. a key stream of a digitized fingerprint) by the reader. In one example embodiment of the invention, the reader uses its own clock cycles to compute a defined part of the key stream. The first bits of the incoming key stream may allow pointing to the user's smart card base address and the subsequent bits could supply the offsets for the correct objects. The functional smart card would then be able to perform initialization by loading the secret 48-bit key stored in the memory for the secret key 402 into the shift register 408 and shifting the string (e.g., ID 401 xor Rb 404) into the state where ID is the identifier of the tag, and Rb is a random number created by the random number generator object 403 selected by the tag. The random number "Rb" is also sent 411 to the reader as a first challenge in a challenge-response protocol in which the tag and reader prove knowledge of the secret key. As a result, a fully virtualized smart card (SC) and reader combination, which utilizes input identifiers to determine the correct location of the base objects and object components may be realized.

Figure 5:
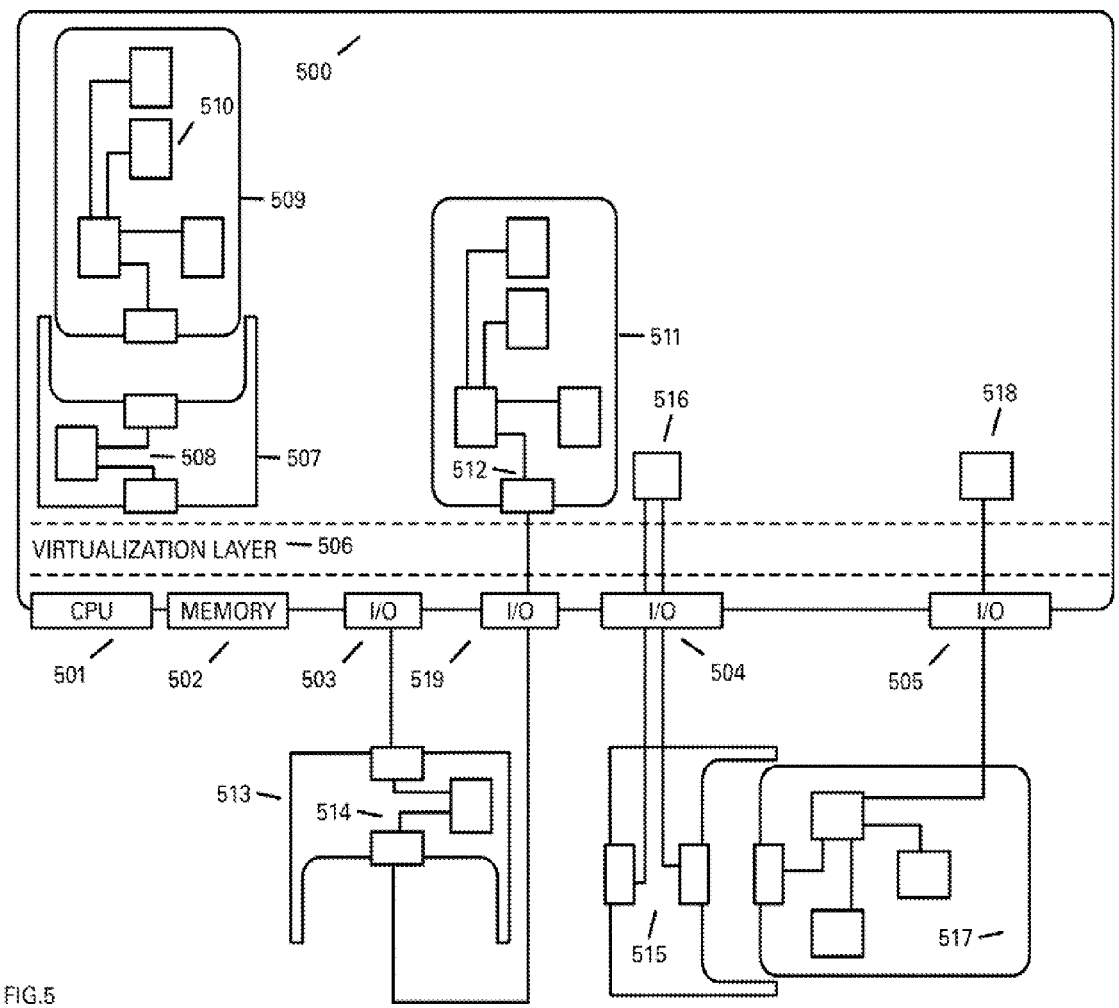
FIG. 5 is a system-level diagram of the operation and features associated with a virtualized smart card (SC), in accordance with the present invention.

FIG. 5 illustrates a host 500 with CPU 501, memory 502, peripheral I/O devices 503, 504, 505 and 519, and a virtualization layer 506 and a fully virtualized SC and reader combination. The fully virtualized SC reader combination consists of a reader object 507 with reader components 508 a SC base object 509 and SC components 510. The SC and reader combination are fully virtualized and recognized from the host as physical components. Instructions to and from the virtual SC and reader combination are binary translated by the virtualization layer 506. SC components may also be partially virtualized. A physical existent reader 513 attached to the host's I/O 503 may communicate with a virtualized SC by connecting it's peripheral I/O interface 514 for the SC with another I/O interface 519 of the host. The virtualization layer 506 redirects and translates all communication activities of the interface 519 to the virtual SC's 511 I/O interface 512. Single components of either the reader and/or the SC may be virtualized. The IC 516 of the SC reader 515 is located within the virtualized area and can be built according to received machine or biometric identifiers that specify its properties or memory location. A single component of a physical existent SC 517 such as RAM 518 may also be virtualized. As with the IC component of the reader, the properties and the memory location of the RAM object are defined by read identifiers.

Figure 6:
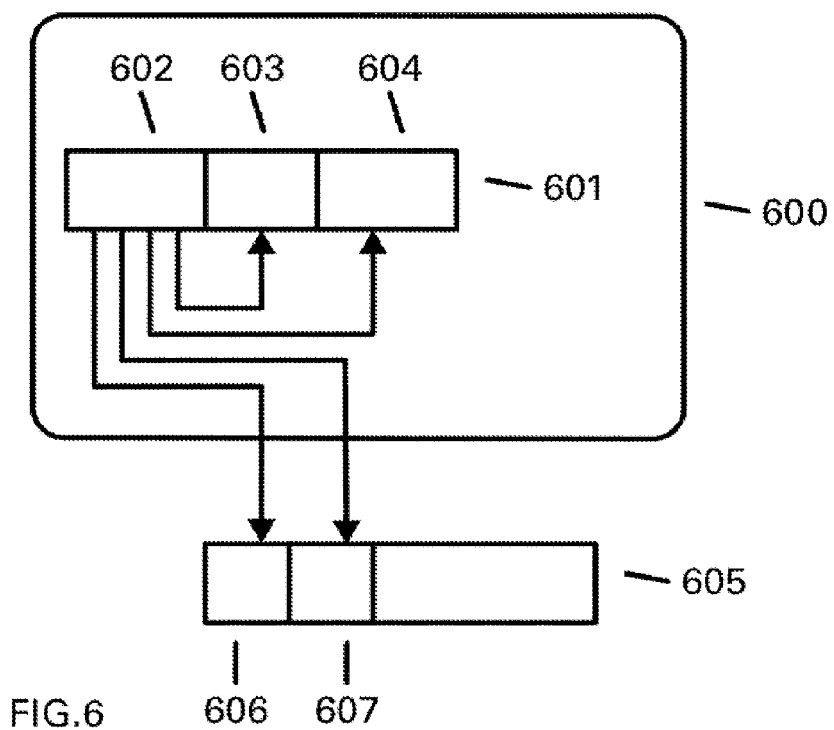
FIG. 6 is a logic diagram of an object configuration of the virtualized smart card (SC), in accordance with the present invention.

An example object configuration is illustrated in the logic diagram of FIG. 6, according to example embodiments. Referring to FIG. 6, read identifiers may influence the target of an operation from the SC's 600 memory 601. The SC's memory may either be virtual or physical memory. In the case of virtual memory, the operation targets the OS which utilizes a mapping table to write and read from the physical memory. As read identifiers may specify the target of an operation, the call from memory location 602 may either reach an appropriate target 603 or the memory location of a dummy object 604. The memory address of a target object may either be located on the SC or on the host's memory 605. A correct identifier would then result in a call to memory address 606 and an incorrect identifier would lead the call to the address of a dummy object 607. Read identifiers may also influence the properties of created or existing virtual SC or reader components. For example, a partial incorrect value of an identifier could lead to creation of alternate components 401 or 402 that then would deliver invalid SECRET KEY and TAG ID's.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of enabling a virtual smart card, the method comprising:
   prompting the user for a unique identifier;
   receiving the unique identifier based on user input;
   initializing the virtual smart card in response to the received unique identifier;
   reading data associated with the unique identifier via a reader device, wherein the data comprises a key stream of digital data bits associated with the unique identifier;
   identifying a user's smart card base address from a first portion of the digital data bits of the key stream; and
   authenticating a user based on received unique identifier and results of the read data.

2. The method of claim 1, wherein the unique identifier comprises digital biometric data.

3. The method of claim 2, wherein the digital biometric data is part of the key stream and is associated with a digitized fingerprint.

4. The method of claim 3, wherein the reader device uses its own clock cycles to compute a defined part of the key stream of the digitized fingerprint.

5. The method of claim 4, wherein subsequent portion of bits of the key stream are offsets of corresponding objects.

6. The method of claim 1, further comprising:
   loading a secret 48-bit key into a shift register; and
   shifting a string into a state that the received unique identifier matches an identifier of a corresponding tag.

7. The method of claim 6, further comprising:
   generating a random number; and
   sending the random number to the reader device and proving that the tag and reader have knowledge of the secret 48-bit key.

8. An apparatus configured to enable a virtual smart card, the apparatus comprising:
   a transmitter configured to transmit a prompt to the user for a unique identifier;
   a receiver configured to receive the unique identifier based on user input; and
   a processor configured to
      initialize the virtual smart card in response to the received unique identifier, read data associated with the unique identifier via a reader device, wherein the data comprises a key stream of digital data bits associated with the unique identifier;
      identify a user's smart card base address from a first portion of the digital data bits of the key stream; and
      authenticate a user based on received unique identifier and results of the read data.

9. The apparatus of claim 8, wherein the unique identifier comprises digital biometric data.

10. The apparatus of claim 9, wherein the digital biometric data is part of the key stream and is associated with a digitized fingerprint.

11. The apparatus of claim 10, wherein the reader device uses its own clock cycles to compute a defined part of the key stream of the digitized fingerprint.

12. The apparatus of claim 11, wherein a subsequent portion of bits of the key stream are offsets of corresponding objects.

13. The apparatus of claim 8, wherein the processor is further configured to load a secret 48-bit key into a shift register, and shift a string into a state that the received unique identifier matches an identifier of a corresponding tag.

14. A non-transitory computer readable storage medium configured to store instructions that when executed cause a processor to enable a virtual smart card, the processor being configured to perform:
   prompting the user for a unique identifier;
   receiving the unique identifier based on user input;
   initializing the virtual smart card in response to the received unique identifier;
   reading data associated with the unique identifier via a reader device, wherein the data comprises a key stream of digital data bits associated with the unique identifier;
   identifying a user's smart card base address from a portion of the digital data bits of the key stream; and
   authenticating a user based on received unique identifier and results of the read data.

15. The non-transitory computer readable storage medium of claim 14, wherein the unique identifier comprises digital biometric data.

16. The non-transitory computer readable storage medium of claim 15, wherein the digital biometric data is part of the key stream and is associated with a digitized fingerprint.

17. The non-transitory computer readable storage medium of claim 16, wherein the reader device uses its own clock cycles to compute a defined part of the key stream of the digitized fingerprint.

18. The non-transitory computer readable storage medium of claim 17, wherein subsequent bits of the key stream are offsets of corresponding objects.

19. The non-transitory computer readable storage medium of claim 14, further comprising:
   loading a secret 48-bit key into a shift register; and
   shifting a string into a state that the received unique identifier matches an identifier of a corresponding tag.

20. The non-transitory computer readable storage medium of claim 19, further comprising:
   generating a random number; and
   sending the random number to the reader device and proving that the tag and reader have knowledge of the secret 48-bit key.

\* \* \* \* \*